(12) United States Patent
Bross et al.

(10) Patent No.: US 12,316,839 B2
(45) Date of Patent: May 27, 2025

(54) FACTIONAL SAMPLE INTERPOLATION FOR REFERENCE PICTURE RESAMPLING

(71) Applicant: FRAUNHOFER-GESELLSCHAFT ZUR FÖRDERUNG DER ANGEWANDTEN FORSCHUNG E.V., Munich (DE)

(72) Inventors: Benjamin Bross, Berlin (DE); Yago Sánchez De La Fuente, Berlin (DE); Robert Skupin, Berlin (DE); Martin Winken, Berlin (DE); Heiko Schwarz, Berlin (DE); Detlev Marpe, Berlin (DE); Thomas Schierl, Berlin (DE); Thomas Wiegand, Berlin (DE)

(73) Assignee: FRAUNHOFER-GESELLSCHAFT ZUR FÖRDERUNG DER ANGEWANDTEN FORSCHUNG E.V., Munich (DE)

( * ) Notice: Subject to any disclaimer, the term of this patent is extended or adjusted under 35 U.S.C. 154(b) by 0 days.

(21) Appl. No.: 18/636,785

(22) Filed: Apr. 16, 2024

(65) Prior Publication Data

US 2024/0267516 A1 Aug. 8, 2024

Related U.S. Application Data

(63) Continuation of application No. 17/787,218, filed as application No. PCT/EP2020/087493 on Dec. 21, 2020, now Pat. No. 11,991,355.

(30) Foreign Application Priority Data

Dec. 20, 2019 (EP) ..................................... 19218738

(51) Int. Cl.
 *H04N 19/117* (2014.01)
 *H04N 19/105* (2014.01)
 (Continued)

(52) U.S. Cl.
 CPC ......... *H04N 19/117* (2014.11); *H04N 19/105* (2014.11); *H04N 19/132* (2014.11); *H04N 19/80* (2014.11)

(58) Field of Classification Search
 CPC .. H04N 19/117; H04N 19/105; H04N 19/132; H04N 19/80; H04N 19/167;
 (Continued)

(56) References Cited

U.S. PATENT DOCUMENTS

2019/0208223 A1 7/2019 Galpin
2019/0261018 A1 8/2019 Bordes
(Continued)

FOREIGN PATENT DOCUMENTS

WO WO 2021/032143 2/2021

OTHER PUBLICATIONS

Samuelsson et al., Adaptive Resolution Change (ARC) with downsampling, JVET-O240, Gothenburg Jul. 2019 (Year: 2019).*
(Continued)

*Primary Examiner* — Marnie A Matt
(74) *Attorney, Agent, or Firm* — NIXON & VANDERHYE P.C.

(57) ABSTRACT

Concepts are described, including encoding of a video into data stream and decoding of a data stream having a video encoded thereinto, using motion compensation prediction
(Continued)

between pictures of equal resolution and pictures of different resolution, based on motion vectors at a half-sample resolution and on motion vectors at a different resolution using interpolation filters to obtain sub-sample values within a reference sample array. The interpolation filter is selected from two interpolation filter versions different in a higher edge preserving property, and the selection is depending on whether a current picture is equal in picture resolution to the reference sample array in horizontal and/or vertical dimension, and/or a constraint information in the data stream.

16 Claims, 12 Drawing Sheets

(51) Int. Cl.
  *H04N 19/132* (2014.01)
  *H04N 19/80* (2014.01)
(58) Field of Classification Search
  CPC .. H04N 19/172; H04N 19/174; H04N 19/523; H04N 19/587
  USPC ...................................... 375/240.02
  See application file for complete search history.

(56) References Cited

U.S. PATENT DOCUMENTS

| | | | |
|---|---|---|---|
| 2022/0078481 A1* | 3/2022 | Lainema | ............. H04N 19/149 |
| 2023/0059366 A1 | 2/2023 | Bross et al. | |

OTHER PUBLICATIONS

Alshin et al., Anti-aliasing motion compensation interpolation downsampling filters for reference picture resampling, JVET-P0390, Geneva Oct. 2019 (Year: 2019).*
International Search Report dated Feb. 8, 2021, for PCT/EP2020/087493, 3 pp.
Written Opinion dated Feb. 8, 2021, for PCT/EP2020/087493, 6 pp.
Alshin (Intel) A et al: "CEI-related: Anti-aliasing motion compensation interpolation downsarnpling filters for reference picture resarnpling", 16. JVET Meeting; Oct. 1, 2019-Oct. 11, 2019; Geneva; (The Joint Video Exploration Team of ISO/IEC JTC1/SC29/WG11 and ITU-T SG.16), No. JVET-P0390 Oct. 2, 2019 (Oct. 2, 2019), XP030217162, Retrieved from the Internet: URL:http://phenix.int-evry.fr/jvet/doc end_user/docurnents/16Geneva/wgll/JVET-P0390-v2.zip JVET-P0390-v2.docx [retrieved on Oct. 2, 2019], 3 pp.
Samuelsson (Sharplabs) J et al: "AHG8: Adaptive Resolution Change (ARC) with downsampling", 15. JVET Meeting; Jul. 3, 2019-Jul. 12, 2019; Gothenburg; (The Joint Video Exploration Team of ISO/IEC JTC1/SC29/WG11 and ITU-T SG.16), No. JVET-00240 Jul. 5, 2019 (Jul. 5, 2019), XP030218946, Retrieved from the Internet: URL:http://phenix.int-evry.fr/jvet/doc end_user/documents/15_Gothenburg/wg11/JVET-00240-v2.zip JVET-00240-v2.docx [retrieved on Jul. 5, 2019], 3 pp.
A Henkel et al., "Alternative Half-Sample Interpolation Filters for Versatile Video Coding," ICASSP 2020-2020 IEEE International Conference on Acoustics, Speech and Signal Processing (ICASSP), Barcelona, Spain, 2020, pp. 2053-2057, doi: 10.1109/ICASSP40776.2020.9054028. (Year: 2020)

* cited by examiner

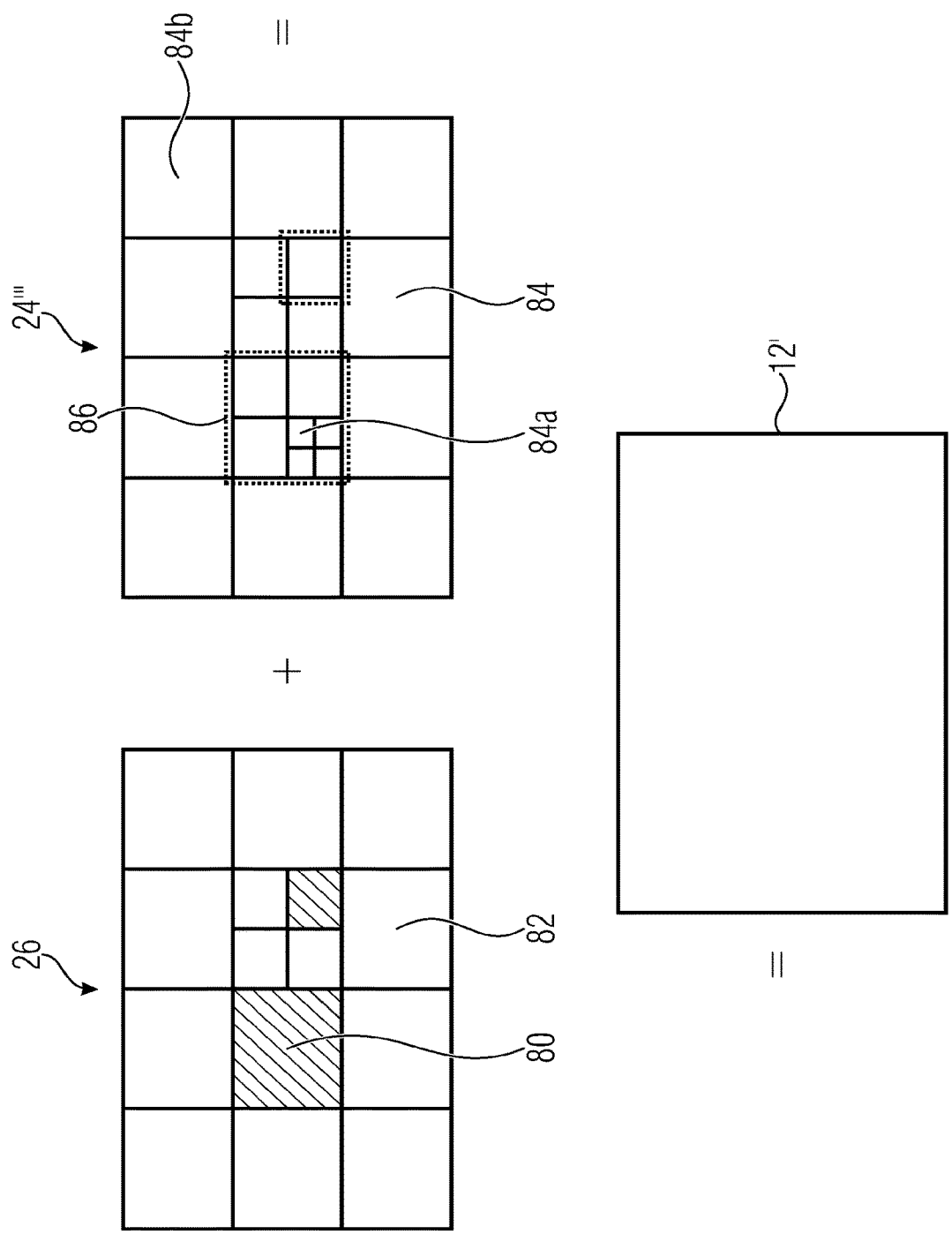

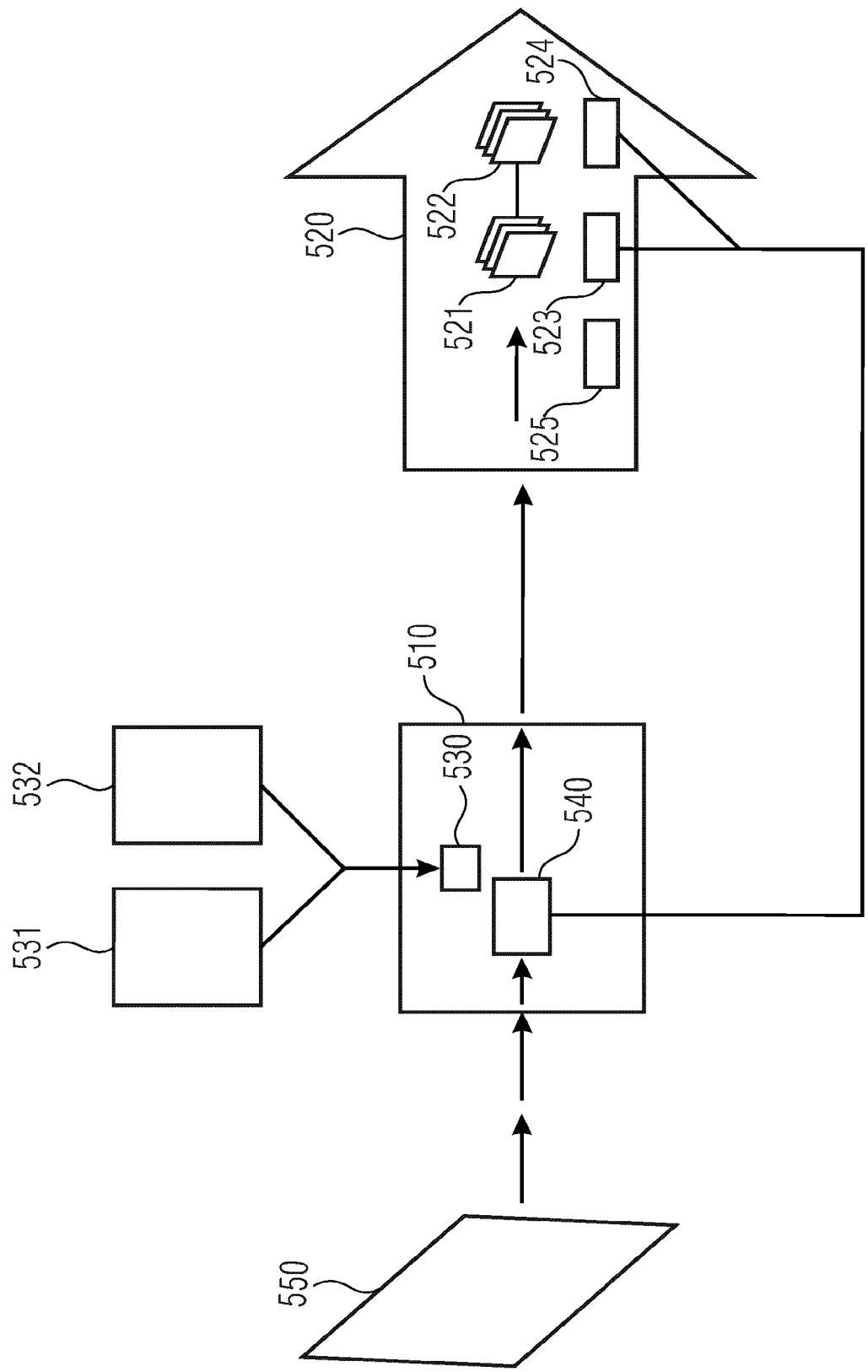

| fractional sample positions p | interpolation filter coefficients ||||||||
|---|---|---|---|---|---|---|---|---|
| | $f_L[p][0]$ | $f_L[p][1]$ | $f_L[p][2]$ | $f_L[p][3]$ | $f_L[p][4]$ | $f_L[p][5]$ | $f_L[p][6]$ | $f_L[p][7]$ |
| 1 | 0 | 1 | -3 | 63 | 4 | -2 | 1 | 0 |
| 2 | -1 | 2 | -5 | 62 | 8 | -3 | 1 | 0 |
| 3 | -1 | 3 | -8 | 60 | 13 | -4 | 1 | 0 |
| 4 | -1 | 4 | -10 | 58 | 17 | -5 | 1 | 0 |
| 5 | -1 | 4 | -11 | 52 | 26 | -8 | 3 | -1 |
| 6 | -1 | 3 | -9 | 47 | 31 | -10 | 4 | -1 |
| 7 | -1 | 4 | -11 | 45 | 34 | -10 | 4 | -1 |
| 8 (hpelIfIdx == 0) | -1 | 4 | -11 | 40 | 40 | -11 | 4 | -1 |
| 8 (hpelIfIdx == 1) | 0 | 3 | 9 | 20 | 20 | 9 | 3 | 0 |
| 9 | -1 | 4 | -10 | 34 | 45 | -11 | 4 | -1 |
| 10 | -1 | 4 | -10 | 31 | 47 | -9 | 3 | -1 |
| 11 | -1 | 3 | -8 | 26 | 52 | -11 | 4 | -1 |
| 12 | 0 | 1 | -5 | 17 | 58 | -10 | 4 | -1 |
| 13 | 0 | 1 | -4 | 13 | 60 | -8 | 3 | -1 |
| 14 | 0 | 1 | -3 | 8 | 62 | -5 | 2 | -1 |
| 15 | 0 | 1 | -2 | 4 | 63 | -3 | 1 | 0 |

Fig. 9

| amvr_flag | amvr_precision_idx | AmvrShift | | |
|---|---|---|---|---|
| | | inter_affine_flag == 1 | CuPredMode[ chType ][ x0 ][ y0 ] == MODE_IBC | inter_affine_flag == 0 && CuPredMode[ chType ][ x0 ][ y0 ] != MODE_IBC |
| 0 | - | 2 (1/4 luma sample) | - | 2 (1/4 luma sample) |
| 1 | 0 | 0 (1/16 luma sample) | 4 (1 luma sample) | 3 (1/2 luma sample) |
| 1 | 1 | 4 (1 luma sample) | 6 (4 luma samples) | 4 (1 luma sample) |
| 1 | 2 | - | - | 6 (4 luma samples) |

Fig. 10

FACTIONAL SAMPLE INTERPOLATION FOR REFERENCE PICTURE RESAMPLING

CROSS-REFERENCE TO RELATED APPLICATION(S)

This application is a continuation of U.S. patent application Ser. No. 17/787,218, filed Jun. 17, 2022, pending, which is the U.S. national phase of PCT International Patent Application No. PCT/EP2020/087493 filed Dec. 21, 2020, which designated the U.S. and claims priority to EP 19218738.3 filed Dec. 20, 2019, the entire contents of each of which are hereby incorporated by reference in this application.

DESCRIPTION

The present application is concerned with video coding concepts, and in particular with interpolation filters for motion compensation.

Current video coding standards such as Versatile Video Coding (VVC) allow to switch interpolation filters for motion compensation depending on a motion vector (MV) resolution, which can be signalled at a block level. In case the MV (or the MV difference MVD) is coded in a particular resolution, e.g. half-sample accuracy, a different interpolation filter could be used to interpolate certain fractional sample positions.

Another new feature is reference picture resampling, which allows referencing previously coded pictures in motion compensated inter-picture prediction having a different resolution/size than the current picture. In order to do that, the referenced picture area is resampled to a block having the same size as the current block. This may lead to the case where several fractional positions are obtained by using different phases of an interpolation filter.

For example, when a 16×16 block references a picture having one fourth of the size in every dimension, the corresponding 4×4 block in the referenced picture needs to be upsampled to 16×16, which can involve different interpolation filters for specific fractional positions/phases. E.g. when the MV is signalled in an accuracy that is associated with a smoothing interpolation filter, this filter is applied to the phase this smoothing filter is associated with in reference picture upsampling, while a sharpening interpolation filter may be applied to the other phases.

This mixup can produce visible artefacts and, thus, results into a poorer motion compensated inter predictor which, in turn, increases the prediction error and the bitrate needed to code the prediction residual to achieve equal quality.

The present application seeks to result in a more efficient video coding concept supporting reference picture resampling. This object is achieved by the subject matter of the independent claims.

Preferred embodiments of the present application are described below with respect to the figures, among which:

FIG. 3 illustrates a relationship between a reconstructed signal and the combination of the prediction residual signal and the prediction signal;

Figure 4A:
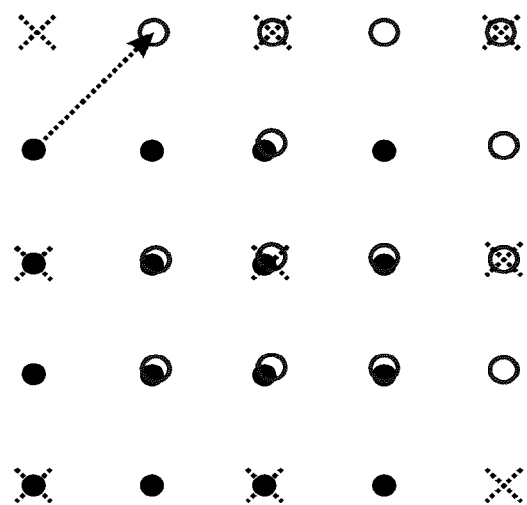
FIG. 4a illustrates samples of a referenced picture and a current picture spatially overlaid.
Figure 4B:
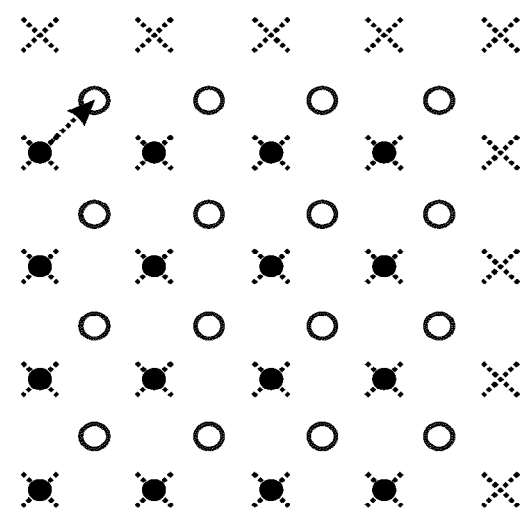
FIG. 4b illustrates samples of a reference and a current picture having the same resolution and the motion vector being defined at half-pel resolution.
Figure 4C:
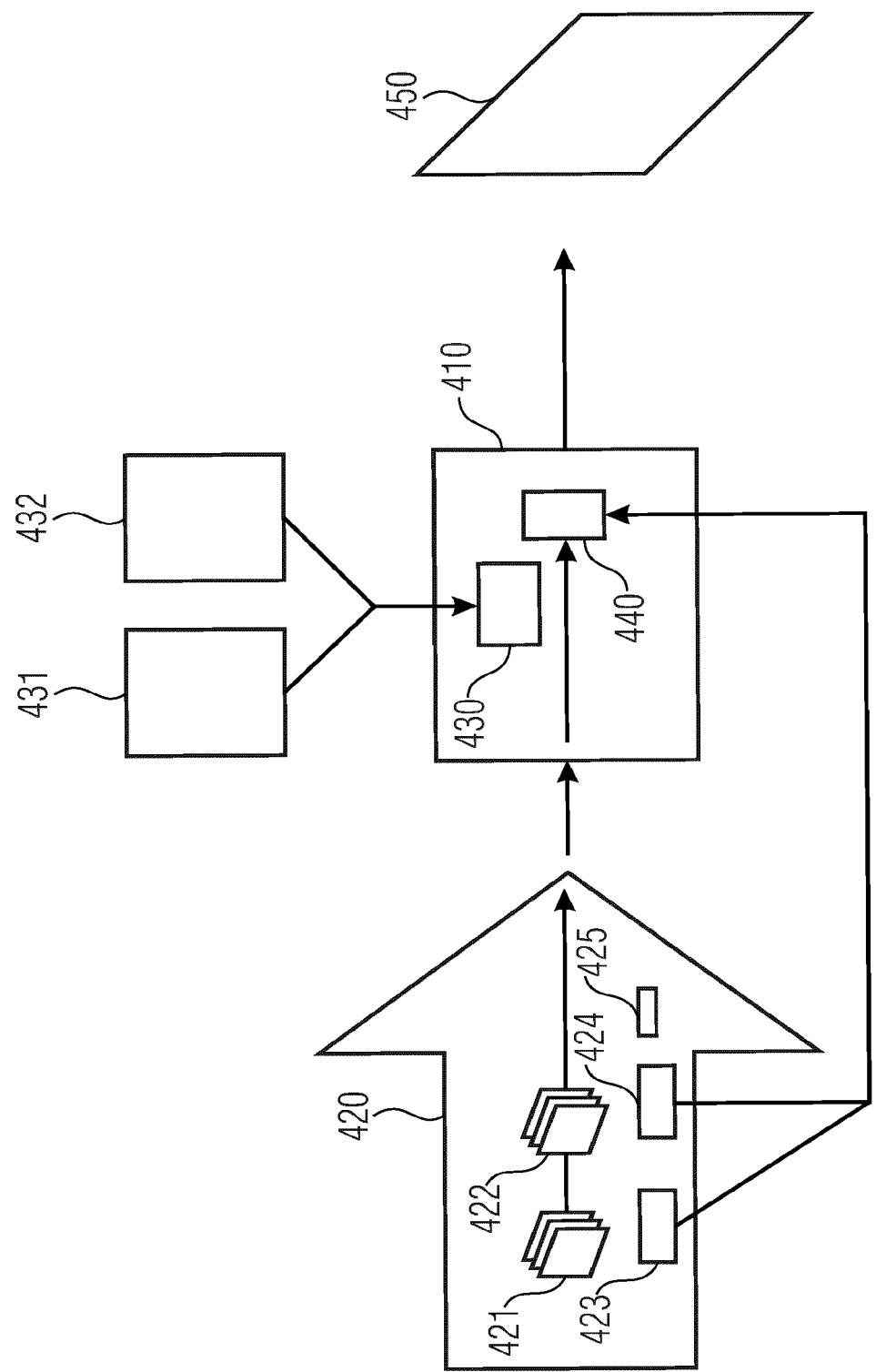
FIG. 4c illustrates a video decoder according to an embodiment of the invention.
Figure 4D:
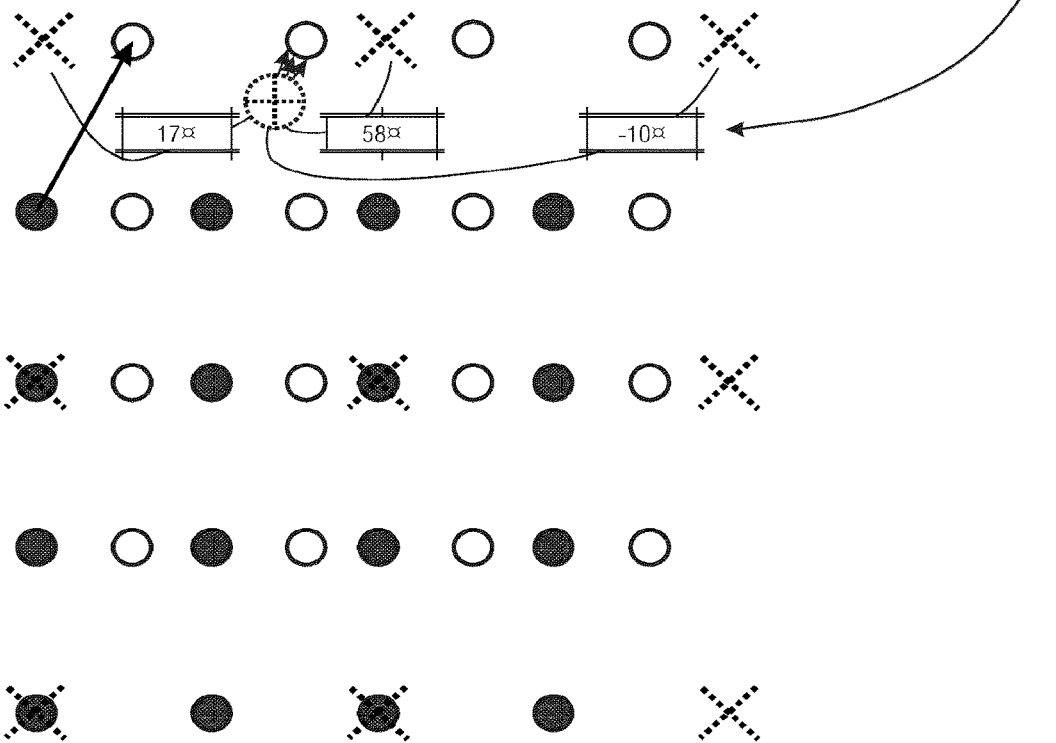
Figure 6:
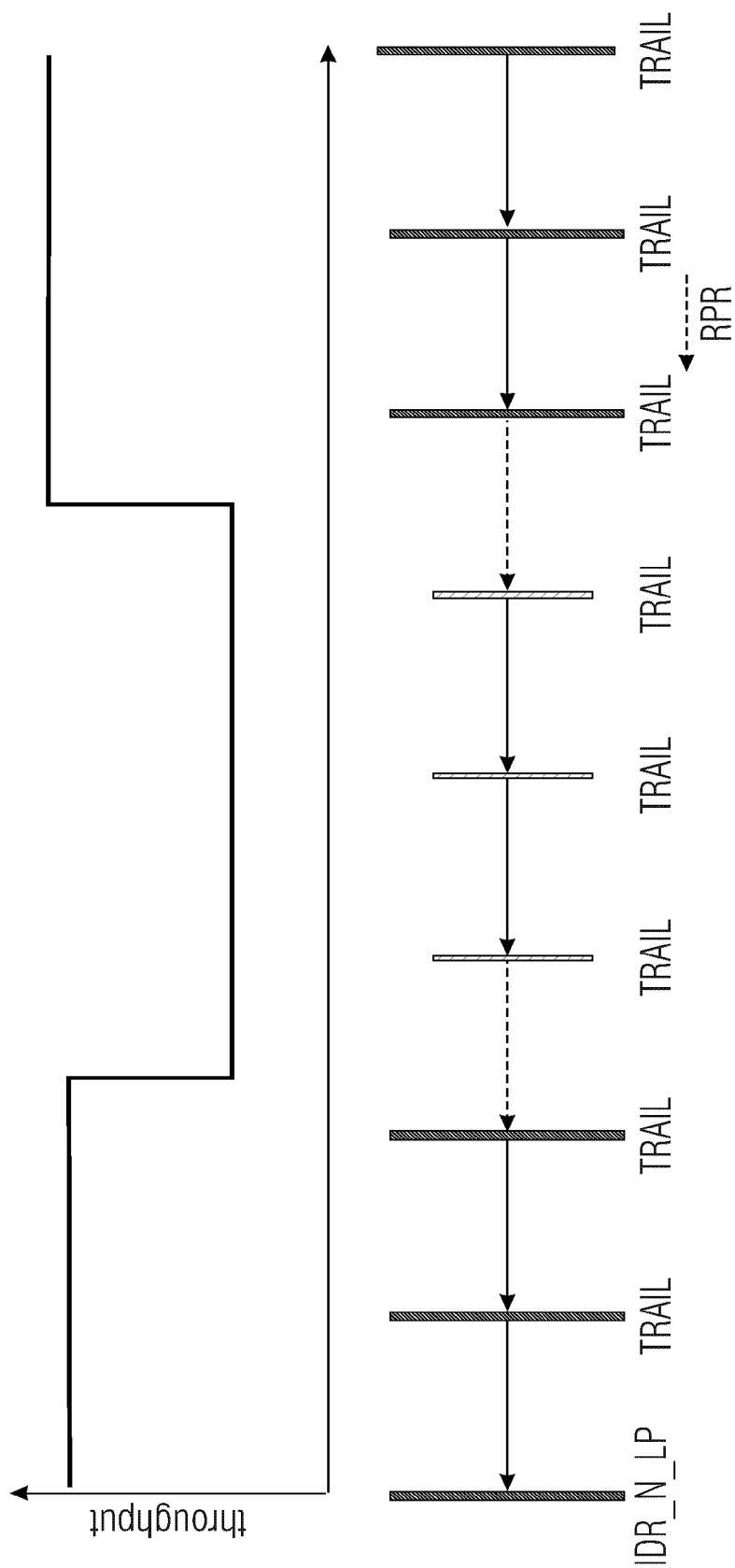
Figure 7:
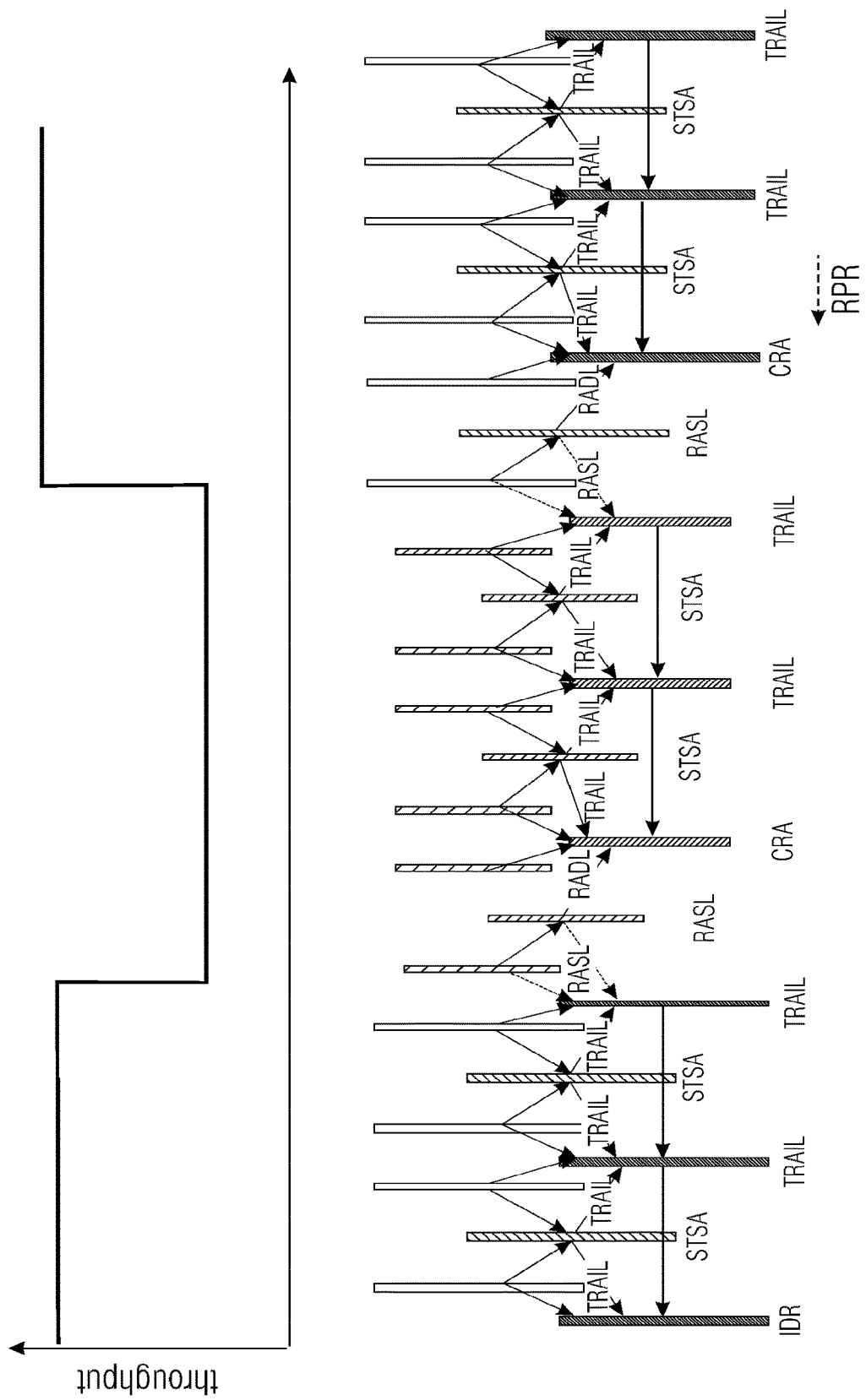
Figure 8:
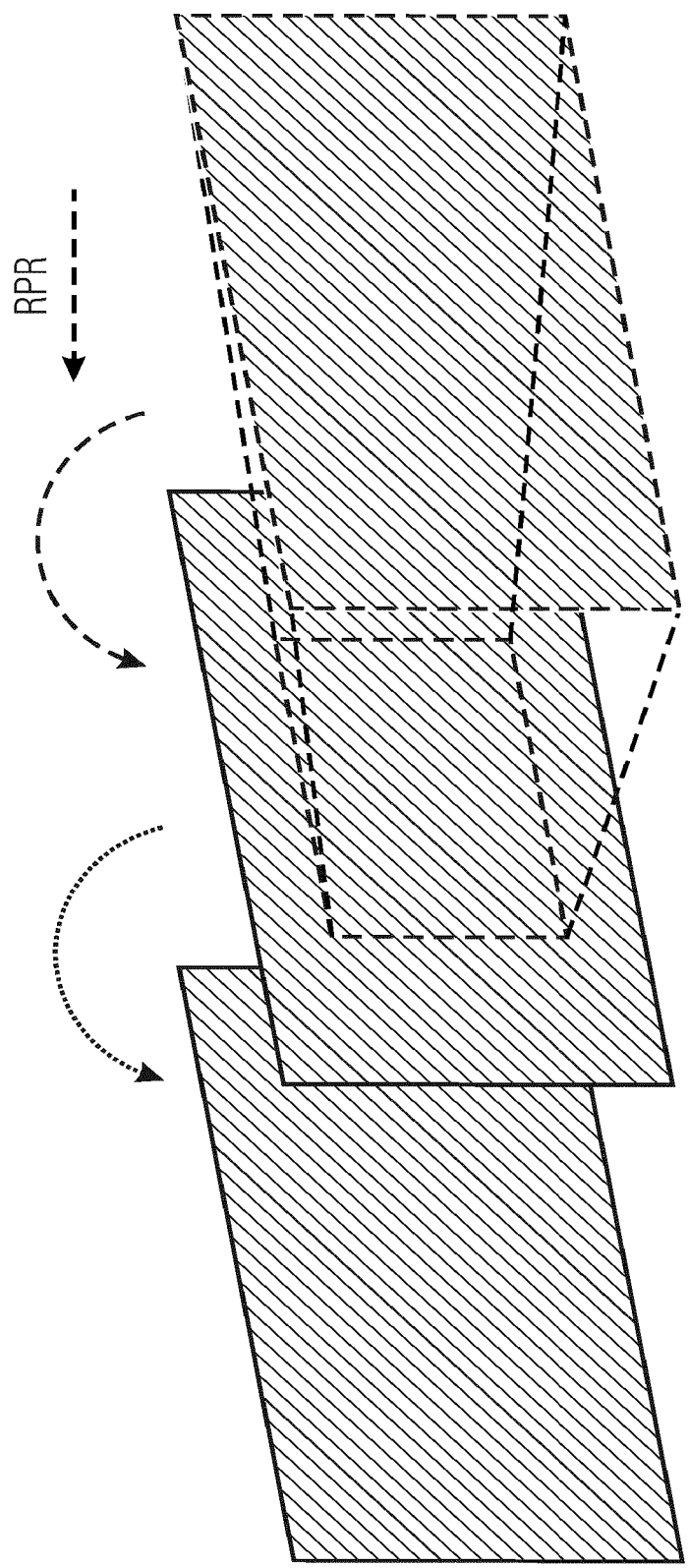

FIG. 4d illustrates the selection of interpolation filters for different types of samples in the reference picture, namely ones differing in phase, here exemplarily using the table of FIG. 9; the selection with respect to half-pel resolution positions has the two options between which embodiments select in an advantageous manner; further, the application of a selected interpolation filter is discussed for one exemplary sample, here a quarter-pel sample; the filter selection among the two half-pel interpolation filters may be done for horizontal and vertical direction separately so that the reference picture may be interpolated vertically for half-pel samples using one half-pel interpolation filter while another half-pel interpolation filter might be used horizontally for interpolation at half-pal positions or the selection is done globally for both directions depending on whether the resolution of current and referenced picture coincides vertically and horizontally, so that either the one or the other half-pel interpolation filter is used horizontally and the vertically;

FIG. 5 illustrates a video encoder according to an embodiment of the invention;

FIG. 6 shows an example of reference picture resampling bitrate adaptation for video conferencing with varying throughput;

FIG. 7 shows an example of reference picture resampling bitrate adaptation for DASH and open GOP resolution switching;

FIG. 8 shows an example of a third picture carrying out RoI zooming in of a portion of a second picture;

FIG. 9 shows an example of a smoothing filter for adaptive motion vector resolution where the motion vector difference is in half-sample resolution, wherein the figure also shows, collected in a table, further interpolation filters to be used for samples of other phase than half-pel phase; and FIG. 10 shows an example for signalling in the bitstream using a syntax amvr_flag equal to 1 and amvr_precision_idx equal to 0.

The following description of the figures starts with a presentation of a description of an encoder and a decoder of a block-based predictive codec for coding pictures of a video in order to form an example for a coding framework into which embodiments of the present invention may be built in. The respective encoder and decoder are described with respect to FIGS. 1 to 3. Thereinafter the description of embodiments of the concept of the present invention is presented along with a description as to how such concepts could be built into the encoder and decoder of FIGS. 1 and 2, respectively, although the embodiments described with the subsequent FIG. 4 and following, may also be used to form encoders and decoders not operating according to the coding framework underlying the encoder and decoder of FIGS. 1 and 2 such as without intra coded blocks competing with inter coded blocks within one picture, and/or such as without transform based residual coding or the like.

Figure 1:
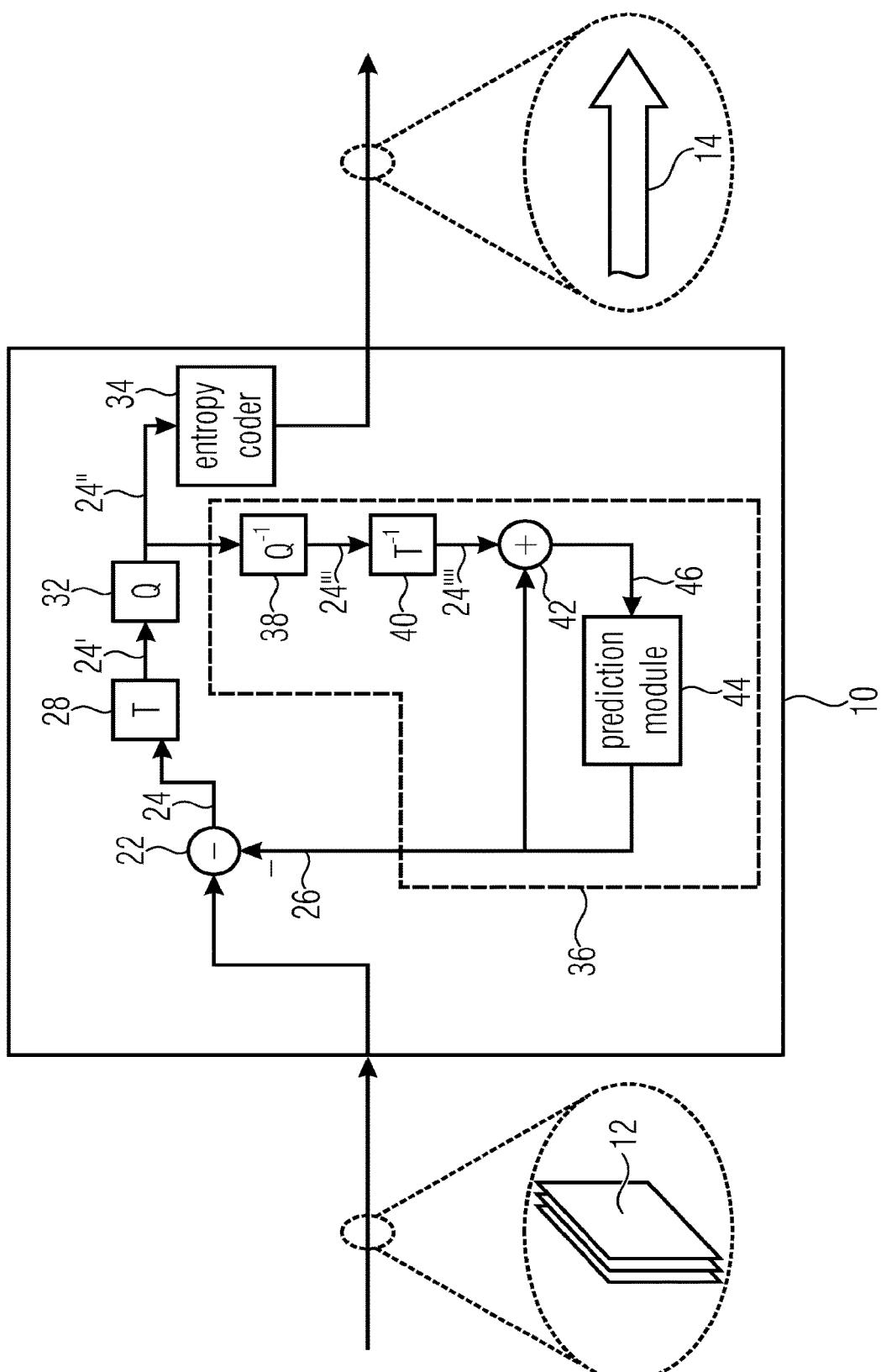
FIG. 1 shows an apparatus for predictively encoding a picture into a data stream.
Figure 2:
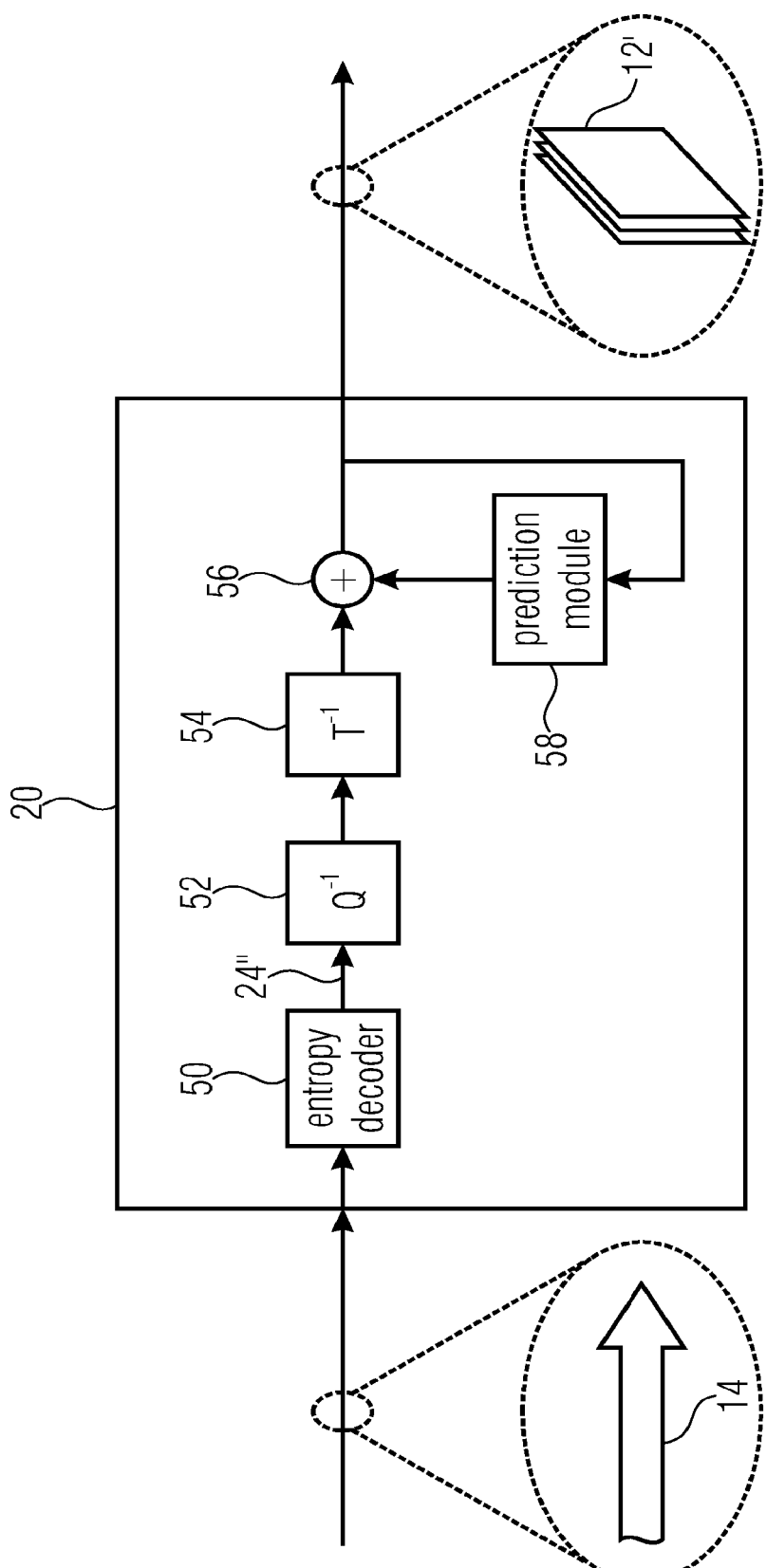
FIG. 2 shows an apparatus for predictively decoding a picture from a data stream.

FIG. 1 shows an apparatus for predictively coding a picture 12 into a data stream 14 exemplarily using transform-based residual coding. The apparatus, or encoder, is indicated using reference sign 10. FIG. 2 shows a corresponding decoder 20, i.e. an apparatus 20 configured to predictively decode the picture 12' from the data stream 14 also using transform-based residual decoding, wherein the apostrophe has been used to indicate that the picture 12' as reconstructed by the decoder 20 deviates from picture 12 originally encoded by apparatus 10 in terms of coding loss introduced by a quantization of the prediction residual signal. FIG. 1 and FIG. 2 exemplarily use transform-based prediction residual coding, although embodiments of the present application are not restricted to this kind of prediction residual coding. This is true for other details described with respect to FIGS. 1 and 2, too, as will be outlined hereinafter.

The encoder 10 is configured to subject the prediction residual signal to spatial-to-spectral transformation and to encode the prediction residual signal, thus obtained, into the data stream 14. Likewise, the decoder 20 is configured to decode the prediction residual signal from the data stream 14 and subject the prediction residual signal thus obtained to spectral-to-spatial transformation.

Internally, the encoder 10 may comprise a prediction residual signal former 22 which generates a prediction residual 24 so as to measure a deviation of a prediction signal 26 from the original signal, i.e. from the picture 12. The prediction residual signal former 22 may, for instance, be a subtractor which subtracts the prediction signal from the original signal, i.e. from the picture 12. The encoder 10 then further comprises a transformer 28 which subjects the prediction residual signal 24 to a spatial-to-spectral transformation to obtain a spectral-domain prediction residual signal 24' which is then subject to quantization by a quantizer 32, also comprised by the encoder 10. The thus quantized prediction residual signal 24" is coded into bitstream 14. To this end, encoder 10 may optionally comprise an entropy coder 34 which entropy codes the prediction residual signal as transformed and quantized into data stream 14. The prediction signal 26 is generated by a prediction stage 36 of encoder 10 on the basis of the prediction residual signal 24" encoded into, and decodable from, data stream 14. To this end, the prediction stage 36 may internally, as is shown in FIG. 1, comprise a dequantizer 38 which dequantizes prediction residual signal 24" so as to gain spectral-domain prediction residual signal 24''', which corresponds to signal 24' except for quantization loss, followed by an inverse transformer 40 which subjects the latter prediction residual signal 24''' to an inverse transformation, i.e. a spectral-to-spatial transformation, to obtain prediction residual signal 24'''', which corresponds to the original prediction residual signal 24 except for quantization loss. A combiner 42 of the prediction stage 36 then recombines, such as by addition, the prediction signal 26 and the prediction residual signal 24'''' so as to obtain a reconstructed signal 46, i.e. a reconstruction of the original signal 12. Reconstructed signal 46 may correspond to signal 12'. A prediction module 44 of prediction stage 36 then generates the prediction signal 26 on the basis of signal 46 by using, for instance, spatial prediction, i.e. intra-picture prediction, and/or temporal prediction, i.e. inter-picture prediction.

Likewise, decoder 20, as shown in FIG. 2, may be internally composed of components corresponding to, and interconnected in a manner corresponding to, prediction stage 36. In particular, entropy decoder 50 of decoder 20 may entropy decode the quantized spectral-domain prediction residual signal 24" from the data stream, whereupon dequantizer 52, inverse transformer 54, combiner 56 and prediction module 58, interconnected and cooperating in the manner described above with respect to the modules of prediction stage 36, recover the reconstructed signal on the basis of prediction residual signal 24" so that, as shown in FIG. 2, the output of combiner 56 results in the reconstructed signal, namely picture 12'.

Although not specifically described above, it is readily clear that the encoder 10 may set some coding parameters including, for instance, prediction modes, motion parameters and the like, according to some optimization scheme such as, for instance, in a manner optimizing some rate and distortion related criterion, i.e. coding cost. For example, encoder 10 and decoder 20 and the corresponding modules 44, 58, respectively, may support different prediction modes such as intra-coding modes and inter-coding modes. The granularity at which encoder and decoder switch between these prediction mode types may correspond to a subdivision of picture 12 and 12', respectively, into coding segments or coding blocks. In units of these coding segments, for instance, the picture may be subdivided into blocks being intra-coded and blocks being inter-coded. Intra-coded blocks are predicted on the basis of a spatial, already coded/decoded neighbourhood of the respective block as is outlined in more detail below. Several intra-coding modes may exist and be selected for a respective intra-coded segment including directional or angular intra-coding modes according to which the respective segment is filled by extrapolating the sample values of the neighbourhood along a certain direction which is specific for the respective directional intra-coding mode, into the respective intra-coded segment. The intra-coding modes may, for instance, also comprise one or more further modes such as a DC coding mode, according to which the prediction for the respective intra-coded block assigns a DC value to all samples within the respective intra-coded segment, and/or a planar intra-coding mode according to which the prediction of the respective block is approximated or determined to be a spatial distribution of sample values described by a two-dimensional linear function over the sample positions of the respective intra-coded block with driving tilt and offset of the plane defined by the two-dimensional linear function on the basis of the neighbouring samples. Compared thereto, inter-coded blocks may be predicted, for instance, temporally. For inter-coded blocks, motion vectors may be signalled within the data stream, the motion vectors indicating the spatial displacement of the portion of a previously coded picture of the video to which picture 12 belongs, at which the previously coded/decoded picture is sampled in order to obtain the prediction signal for the respective inter-coded block. This means, in addition to the residual signal coding comprised by data stream 14, such as the entropy-coded transform coefficient levels representing the quantized spectral-domain prediction residual signal 24", data stream 14 may have encoded thereinto coding mode parameters for assigning the coding modes to the various blocks, prediction parameters for some of the blocks, such as motion parameters for inter-coded segments, and optional further parameters such as parameters for controlling and signalling the subdivision of picture 12 and 12', respectively, into the segments. The decoder 20 uses these parameters to subdivide the picture in the same manner as the encoder did, to assign the same prediction modes to the segments, and to perform the same prediction to result in the same prediction signal.

FIG. 3 illustrates the relationship between the reconstructed signal, i.e. the reconstructed picture 12', on the one hand, and the combination of the prediction residual signal 24'''' as signalled in the data stream 14, and the prediction signal 26, on the other hand. As already denoted above, the combination may be an addition. The prediction signal 26 is illustrated in FIG. 3 as a subdivision of the picture area into intra-coded blocks which are illustratively indicated using hatching, and inter-coded blocks which are illustratively indicated not-hatched. The subdivision may be any subdivision, such as a regular subdivision of the picture area into rows and columns of square blocks or non-square blocks, or a multi-tree subdivision of picture 12 from a tree root block into a plurality of leaf blocks of varying size, such as a quadtree subdivision or the like, wherein a mixture thereof is illustrated in FIG. 3 in which the picture area is first subdivided into rows and columns of tree root blocks which are then further subdivided in accordance with a recursive multi-tree subdivisioning into one or more leaf blocks.

Again, data stream 14 may have an intra-coding mode coded thereinto for intra-coded blocks 80, which assigns one of several supported intra-coding modes to the respective intra-coded block 80. For inter-coded blocks 82, the data stream 14 may have one or more motion parameters coded thereinto. Generally speaking, inter-coded blocks 82 are not restricted to being temporally coded. Alternatively, inter-coded blocks 82 may be any block predicted from previously coded portions beyond the current picture 12 itself, such as previously coded pictures of a video to which picture 12 belongs, or picture of another view or an hierarchically lower layer in the case of encoder and decoder being scalable encoders and decoders, respectively.

The prediction residual signal 24'''' in FIG. 3 is also illustrated as a subdivision of the picture area into blocks 84. These blocks might be called transform blocks in order to distinguish same from the coding blocks 80 and 82. In effect, FIG. 3 illustrates that encoder 10 and decoder 20 may use two different subdivisions of picture 12 and picture 12', respectively, into blocks, namely one subdivisioning into coding blocks 80 and 82, respectively, and another subdivision into transform blocks 84. Both subdivisions might be the same, i.e. each coding block 80 and 82, may concurrently form a transform block 84, but FIG. 3 illustrates the case where, for instance, a subdivision into transform blocks 84 forms an extension of the subdivision into coding blocks 80, 82 so that any border between two blocks of blocks 80 and 82 overlays a border between two blocks 84, or alternatively speaking each block 80, 82 either coincides with one of the transform blocks 84 or coincides with a cluster of transform blocks 84. However, the subdivisions may also be determined or selected independent from each other so that transform blocks 84 could alternatively cross block borders between blocks 80, 82. As far as the subdivision into transform blocks 84 is concerned, similar statements are thus true as those brought forward with respect to the subdivision into blocks 80, 82, i.e. the blocks 84 may be the result of a regular subdivision of picture area into blocks (with or without arrangement into rows and columns), the result of a recursive multi-tree subdivisioning of the picture area, or a combination thereof or any other sort of blockation. Just as an aside, it is noted that blocks 80, 82 and 84 are not restricted to being of quadratic, rectangular or any other shape.

FIG. 3 further illustrates that the combination of the prediction signal 26 and the prediction residual signal 24'''' directly results in the reconstructed signal 12'. However, it should be noted that more than one prediction signal 26 may be combined with the prediction residual signal 24'''' to result into picture 12' in accordance with alternative embodiments.

In FIG. 3, the transform blocks 84 shall have the following significance. Transformer 28 and inverse transformer 54 perform their transformations in units of these transform blocks 84. For instance, many codecs use some sort of DST or DCT for all transform blocks 84. Some codecs allow for skipping the transformation so that, for some of the transform blocks 84, the prediction residual signal is coded in the spatial domain directly. However, in accordance with embodiments described below, encoder 10 and decoder 20 are configured in such a manner that they support several transforms. For example, the transforms supported by encoder 10 and decoder 20 could comprise:

DCT-II (or DCT-III), where DCT stands for Discrete Cosine Transform
DST-IV, where DST stands for Discrete Sine Transform
DCT-IV
DST-VII
Identity Transformation (IT)

Naturally, while transformer 28 would support all of the forward transform versions of these transforms, the decoder 20 or inverse transformer 54 would support the corresponding backward or inverse versions thereof:

Inverse DCT-II (or inverse DCT-III)
Inverse DST-IV
Inverse DCT-IV
Inverse DST-VII
Identity Transformation (IT)

It should be noted that the set of supported transforms may comprise merely one transform such as one spectral-to-spatial or spatial-to-spectral transform.

As already outlined above, FIGS. 1 to 3 have been presented as an example where the inventive concept described further below may be implemented in order to form specific examples for encoders and decoders according to the present application. Insofar, the encoder and decoder of FIGS. 1 and 2, respectively, may represent possible implementations of the encoders and decoders described herein below. FIGS. 1 and 2 are, however, only examples. An encoder according to embodiments of the present application may, however, perform block-based encoding of a picture 12 using the concept outlined in more detail below and being different from the encoder of FIG. 1 such as, for instance, in that same does not support intra-prediction, or in that the subdivision into blocks 80 is performed in a manner different than exemplified in FIG. 3. Likewise, decoders according to embodiments of the present application may perform block-based decoding of picture 12' from data stream 14 using the coding concept further outlined below, but may differ, for instance, from the decoder 20 of FIG. 2 in that same does not support intra-prediction, or in that same sub-divides picture 12' into blocks in a manner different than described with respect to FIG. 3 and/or in that same does not derive the prediction residual from the data stream 14 in transform domain, but in spatial domain, for instance.

There are several applications that make use of resolution adaptation for several purposes, e.g. bitrate adaptation for throughput variation or for Region of Interest (RoI) use-cases.

The current VVC draft specifies a process usually referred to as reference picture resampling, which allows having a varying picture size within a video sequence of RoI encoding processes as in the examples shown from FIG. 6 to FIG. 8. For this purpose, the VVC specification draft includes a maximum picture size in the Sequence Parameter Set (SPS), an actual picture size in the Picture Parameter Set (PPS) and scaling window offsets (e.g. red margins in FIG. 8) in the PPS that allow deriving the scaling ratios that need to be used between the current picture and the referenced pictures.

After having described a possible implementation of an encoder and decoder framework into which embodiments of the present application could be built into, the description preliminarily refers again to the current VVC development and motivates the specifics of the embodiments outlined later on.

In VVC, the scaling ratios are derived as follows using the width of the pictures considering the scaling windows defined in the PPSs for the current picture (PicOutputWidthL) and the reference picture (fRefWidth):

$$RefPicScale[\,i\,][\,j\,][\,0\,] =$$
$$((\,fRefWidth \ll 14\,) + (\,PicOutputWidthL \gg 1\,))/PicOutputWidthL$$
$$RefPicScale[\,i\,][\,j\,][\,1\,] =$$
$$((\,fRefHeight \ll 14\,) + (\,PicOutputHeightL \gg 1\,))/PicOutputHeightL$$

PicOutputWidth and PicOutputHeight are also sometimes referred to as CurrPicScalWinWidth and CurrPicScalWinHeight hereinbelow.

Scale ratios<1—i.e., RefPicScale values<(1<<14)—mean that the current picture is bigger than the reference picture and ratios>1—i.e., RefPicScale values>(1<<14) mean that the current picture is smaller than the reference picture.

The current VVC draft specifies 4 interpolation filters for motion compensation up to $\frac{1}{16}$ of a sample using fractional sample interpolation. The first one was designed for the regular motion compensation case, when there is no reference picture resampling, RPR, and it is not an affine mode. A second filter was designed for the case that affine mode is used. The two remaining filters are used for downsampling with factors of 1.5 and 2.

Scaling ratios are allowed to be from $\frac{1}{8}$ (8× upsampling) to 2 (2× downsampling). Depending on whether an affine mode is used and the scaling ratio, one of the four filters is used. The conditions are as follows:
  Affine mode is used=>Interpolation filter for affine
  Scaling ratio>1.75=>Interpolation filter for 2× downsampling is used
  1.25<Scaling ratio<=1.75=>Interpolation filter for 1.5× downsampling is used
  Scaling ratio<=1.25=>Regular interpolation filter as if there was no RPR For a resolution change where the current picture is bigger than the reference picture or for very small values of ratios when the current picture is smaller than the reference picture (Scaling ratio<=1.25× downsampling factor), the regular interpolation filter is used.

The regular interpolation filter used for the cases where no affine mode is used, or there is no RPR (scaling ratio=1), or the scaling ratio is less than or equal to 1.25, can apply a specific smoothing filter.

The $\frac{1}{16}$ sample regular interpolation filter is defined in VVC as an 8-tap filter. However, the VVC specification defines a special 6-tap smoothing filter that is used in the following case:
  No Intra-Block Copy (IBC) mode
  Motion vector difference resolution is signalled in $\frac{1}{2}$ luma sample resolution.

This 6-tap smoothing filter is used when adaptive motion vector resolution is used and the motion vector difference is in half-sample resolution. The filter is replicated in FIG. 9.

Given the $\frac{1}{16}$ fractional sample accuracy in VVC, the fractional sample position p=8 corresponds to the half-sample position ($\frac{8}{16}=\frac{1}{2}$). The variable hpelIfIdx equal to 1 indicates whether the 6-tap smoothing filter (highlighted) is used for the half-sample positions. hpelIfIdx is set to 1 when AmvrShift is equal to 3, which in case no IBC mode is used, indicates half-sample MVD resolution. This is signalled in the bitstream using the syntax amvr_flag equal to 1 and amvr_precision_idx equal to 0. See also FIG. 10.

When RPR is not used, the smoothing filter is used to generate each sample in the reference block in the cases described above as each sample in the block refers to the same fractional (half-sample) interpolation position. However, when RPR is used, each sample may refer to a different fractional interpolation position.

Note in the following text that a n-sample difference in current bock ($x''_L-x'_L$ or $y''_L-y'_L$) is affected by the scaling ratio.

For each luma sample location
  ($x_L=0$ ... sbWidth−1+brdExtSize, $y_L=0$ ... sbHeight−1+brdExtSize) inside the prediction luma sample array predSamplesLX, the corresponding prediction luma sample value predSamplesLX[$x_L$][$y_L$] is derived as follows:
  Let (refxSb$_L$, refySb$_L$) and (refx$_L$, refy$_L$) be luma locations pointed to by a motion vector (refMvLX [0], refMvLX[1]) given in $\frac{1}{16}$-sample units. The variables refxSb$_L$, refx$_L$, refySb$_L$, and refy$_L$ are derived as follows:

$$refxSb_L = (((xSb - scaling\_win\_left\_offset) \ll 4) + refMvLX[\,0\,])*$$
$$scalingRatio[\,0\,]\,)refx_L =$$
$$((Sign(refxSb_L)*((Abs(refxSb_L) + 128) \gg 8) +$$
$$x_L*((scalingRatio[\,0\,] + 8) \gg 4)) + fRefLeftOffset + 32) \gg 6 \; refySb_L =$$
$$(((ySb - scaling\_win\_top\_offset) \ll 4) + refMvLX[\,1\,])*$$
$$scalingRatio[\,1\,]\,refy_L =$$
$$((Sign(refySb_L)*((Abs(refySb_L) + 128) \gg 8) +$$
$$yL*((scalingRatio[\,1\,] + 8) \gg 4)) + fRefTopOffset + 32) \gg 6$$

Therein scaling_win_left_offset could be calculated as SubWidthC×pps_scaling_win_left_offset and scaling_win_top_offset could be calculated as SubHeightC×pps_scaling_win_top_offset.

For instance, let's assume that the current picture is 2× bigger than the reference picture. This, is depicted in FIG. 4a where samples of the referenced picture and the current picture are shown spatially overlaid with crosses showing samples of the reference(d) picture and block circles showing samples of the current picture. A current 4×4 block of the current picture is shown. The motion vector for that block is shown by an arrow. It is defined at half-pel resolution relative to the pel grid of the samples of the current picture. The resulting block samples' positions within the reference picture, at which the reference picture is to be interpolated to yield the predictor for the block in the current picture, are shown using white circles. The motion vector is exemplarily selected such that same makes that the sample $x'_L=0$ (the upper left sample of the 4×4 block) points to a half-sample position, and the sample $x'_L=1$ (the sample to the right thereof) would point to an integer- or full-sample position, both positions being indicated as being half-pel or full-pel with respect to the reference picture. This situation of leading to pixels associated with different-pel positions—or, in other words, different phases—does not occur with reference and current pictures having the same resolution and the motion vector being defined at half-pel resolution as shown in FIG. 4b. Similarly, if the scaling would be 4× instead of 2×, and the sample $x'_L=0$ points to a half-sample position, the sample $x'_L=1$ would point to a quarter-sample position and the sample $x'_L=2$ would point to an integer-sample position.

This means that within a single block, some samples would use a smoothing filter and some not, which would lead to an unpleasant visual effect and visible artefacts.

In one embodiment, the derivation of the variable hpellfldx in the motion compensation step is modified to include the scaling ratio between current and reference picture as follows:

hpellfldx=1 if AmvrShift is equal to 3 and scaling ratio==1, i.e. RefPicScale is equal to 16384.

FIG. 4c illustrates a video decoder according to the present invention. The video decoder 410 decodes a video 450 from a data stream 420 using motion compensation prediction. The motion prediction could be performed in motion prediction portion 440, and is based on first motion vectors 423 and second motion vectors 424, which are transmitted in the data stream 420.

The first motion vectors 423 are transmitted in the data stream 420 at a first resolution being half-sample resolution, and the second motion vectors 423 are transmitted in the data stream 420 at a second resolution being different from the first resolution.

The motion compensation is performed between first pictures 421 of equal picture resolution and second pictures 422 of different picture resolution, i.e. RPR is supported or, in other words, motion vectors may point from a current picture to a reference picture of the same resolution as the current picture, with then both forming first pictures, and motion vectors may point from a current picture to a reference picture of a different resolution than the current picture, with then both forming second pictures. The pictures sizes and/or resolution, thus, may vary, and is signalled in the data stream. The motion compensation is performed using interpolation filters 431 and 432 to obtain sub-sample values within the reference picture, i.e. within the reference sample array.

The video decoder 410 selects, for example, in a selection portion 430, the interpolation filter for a predetermined first motion vector, from a first interpolation filter version 431 and a second interpolation filter version 432. The second interpolation filter version 432 has a higher edge preserving property than the first interpolation filter version 431. As will be shown in more details below, this selection may be specific for samples of a certain phase or, differently speaking, at certain sub-pel positions such as half-pel positions.

The selection of the interpolation filter is depending on whether a current picture, to which the predetermined first motion vector belongs, is equal in picture resolution to the reference sample array, to which the predetermined first motion vector relates. The selection and the check on equality may be done separately for the dimensions, i.e. in horizontal and/or vertical dimension. Additionally or alternatively, the selection could also be depending on a constraint information 425 being transmitted in the data stream as will be outlined in more details below.

The dependence of the constraint information 425 is not shown in FIG. 4c.

Further, encoder and decoder can obtain full-sample values within the reference sample array for the predetermined first motion vector without using the interpolation filter. In FIGS. 4a and 4b, for instance, the motion vectors shown therein are "first motion vectors" if they are transmitted in the data stream at half-pel resolution such as using Amvr-Shift=3. The positions to which the samples of the predicted block are shifted according to the respective motion vector, are shown in FIGS. 4 and 4b by circles. Those circles falling onto crosses are "full-sample values". They may directly by determined from the collocated samples of the reference picture (the crosses) without any interpolation. That is, the samples values of the samples of the reference picture, onto which shifted positions of samples of the inter-predicted block fall directly, are directly used as predictor for the samples of the inter-predicted block whose shifted positions fall onto them. Naturally, the same may apply with respect to shifted sample positions of inter-predicted block with second motion vectors, i.e. motion vectors transmitted in the data stream at a resolution other than half-pel.

Also, the decoder can obtain non half-sample sub-sample values by using further interpolation filters, for example using a filter having a higher edge preserving property than the first interpolation filter version. Show again to FIGS. 4a and 4b. "Non half-sample sub-sample values" are those circles neither falling onto any reference picture sample, nor laying halfway between two horizontal, vertical or diagonal immediate neighbouring samples of the reference pictures, i.e. neither falling onto any cross, nor laying halfway between two horizontal, vertical or diagonal immediate neighbouring crosses. For same, an interpolation filter with higher edge preserving property is used. See, FIG. 4d, where this is illustrated for a quarter-pel position: The shifted position of the uppermost and second-from left sample of the block is a quarter pel position. It is sample position $^{12}/_{16}^{th}$ of a full sample pitch away to the right from a reference picture sample (the upper left cross in FIG. 4d). The interpolation filter for to be used for determined the value of that shifted sample, i.e. the uppermost and second-from left white circle, is thus defined in the corresponding entry of the table of FIG. 9, i.e. the entry for the $^{12}/_{16}^{th}$ positions. It's a FIR filter. The table comprises the filter coefficients to be applied to the reference picture's samples between which the sample position to be interpolated is positioned FIG. 4d highlights the entry where the interpolation filter is defined and illustrates the weighted some of reference picture samples according to this filter to yield the interpolated quarter-pel sample. Note that horizontal interpolation may be applied first so as to obtain sample values at sub-pel positions between the samples of the reference picture, with then performing vertical interpolation using these interpolated intermediate samples in order to obtain the actually wanted sub-pel samples, if the wanted sub-pel samples are offset, at sub-sample accuracy, from the reference picture samples vertically and horizontally, or vice versa, i.e. firstly vertically and then horizontally. Again, the selection between the two half-pel sample position interpolation filter version might be done separately for horizontal and vertical direction or globally for both direction depending on the equality of picture resolution in both dimensions.

As stated above, the selection can be performed separately for horizontal and vertical interpolation. The selection is illustrated in FIG. 4d at the two entries concerning half-pel position $^8/_{16}$: Which filter to take depends on hpellfldx. The latter variable is set depending on whether, for instance, reference and current pictures have the same resolution. The latter check on equality may be performed separately for a and y as illustrated below by the usage of the terms hpelHorlfldx and hpelVerlfldx. In particular, the second interpolation filter, that is the filter with the higher edge preserving property, might be selected for horizontal interpolation if the current picture and the reference sample array are not equal in horizontal picture resolution. That's the filter defined in the row of the table where hpellfldx=0. Likewise, for example, the second interpolation filter, that is the filter with the higher edge preserving property, can be selected for vertical interpolation if the current picture and the reference sample array are not equal in vertical picture resolution. And, if the current picture and the reference sample array are not equal in horizontal and vertical picture resolution, the second interpolation filter, that is the filter with the higher edge preserving property, can be selected for horizontal and vertical interpolation. For any direction, for which the second interpolation filter is not used, the first interpolation filter is used, i.e. the one in the row of the table where hpellfldx=1.

The selection of which filter to take among the two half-pel position interpolation filters is, naturally, may interpreted as being performed for all motion vectors, not only the ones being half-pel motion vectors. See in that broad manner, the selection among the two also depends on whether the motion vector is of half-sample resolution or not. If it is, then the selection is done as described so far depending on resolution equality between reference and current pictures, if it is not, then the selection takes the second interpolation filter with the higher edge-preserving property inevitably.

As became clear from the above description, the decoder can use an alphabet of one or more syntax elements in the data stream so as to determine the resolution at which a certain motion vector is transmitted in the data stream. For example, an adaptive motion vector resolution might be indicated by an amvr_flag, and if same is set, thereby conforming a deviation from some default motion vector resolution, and an adaptive motion vector resolution precision can be indicated by an index amvr_precision_idx. This syntax is used an decoded by decoder to derive the resolution at which a motion vector of a specific inter-predicted block is transmitted in the data stream, and this syntax is coded correspondingly in order indicate a motion vector's resolution by the encoder.

The decoder and encoder may exclude the half-pel resolution from the set of signalable settings for the motion vector resolution. They can map the alphabet of the one or more syntax elements onto a first set of vector resolutions, which do not comprise half-sample resolution, if one of the following conditions is met (while the mapping is done onto a second set of vector resolutions including the half-sample resolution, otherwise):

a constraint information indicates that the filter version having the lower edge preserving property is disabled, e.g. for the current picture. This can for example be indicated in a picture or slice header, and for example by a ph_disable_hpel_smoothing_filter or sh_disable_hpel_smoothing_filter constraint equal to 1.

the current picture to which the predetermined first motion vector belongs and the reference sample array to which the predetermined first motion vector relates, are at least different in one dimension of picture resolution.

a constraint information indicates that resampling of the reference sample array is enabled. This can be indicated for example on the sequence level in a sequence parameter set, SPS. An example for such an indication is a sps_ref_picture_resample_enable_flag equal to 1. Thereby the filter version having the higher edge preserving property is used when reference sample array resampling is enabled.

The decoder would map the alphabet onto a second set of vector resolutions, which comprises half-sample resolution, if none of the above conditions is met.

It is also noted that the data stream can comprise information whether temporal consecutive pictures have same or different horizontal and/or vertical picture resolution dimensions.

Further, as stated above, the current picture can in particular be equal in picture resolution to the reference sample array in horizontal and vertical dimension.

And the reference sample array can be a region, subpicture or picture.

The decoder can also derive the constraint information from the data stream in one of per sequences of pictures, picture-wise, or slice-wise.

FIG. 5 illustrates a video encoder according to the present invention. Therein the same principles apply as for the decoder. In summary, the video encoder 510 encodes a video 550 into a data stream 520 using motion compensation prediction. The motion prediction could be performed in motion prediction portion 540. The encoder 510 indicates in by transmitting in the data stream 520 first motion vectors 523 and second motion vectors 524.

The first motion vectors 523 are transmitted in the data stream 520 at a first resolution being half-sample resolution, and the second motion vectors 523 are transmitted in the data stream 520 at a second resolution being different from the first resolution.

The motion compensation is performed between first pictures 521 of equal picture resolution and second pictures 522 of different picture resolution using interpolation filters 531 and 532 to obtain sub-sample values within the reference picture, i.e. within the reference array.

The video encoder 510 selects, for example in a selection portion 530, the interpolation filter for a predetermined first motion vector, from a first interpolation filter version 531 and a second interpolation filter version 532. The second interpolation filter version 532 has a higher edge preserving property than the first interpolation filter version 531.

The selection of the interpolation filter is depending on whether a current picture, to which the predetermined first motion vector belongs, is equal in picture resolution to the reference sample array, to which the predetermined first motion vector relates, in horizontal and/or vertical dimension. Additionally or alternatively, the selection could also be depending on a constraint information 525 to be transmitted in the data stream.

As stated before, the same principles that can be embodied by the decoder can also be embodied by the encoder.

Thus, also the encoder can obtain full-sample values within the reference sample array for the predetermined first motion vector without using the interpolation filter.

Also, the encoder can obtain non half-sample sub-sample values by using further interpolation filters, for example using a filter having a higher edge preserving property than the first interpolation filter version.

As stated above, the selection can be performed separately for horizontal and vertical interpolation.

In particular, the second interpolation filter, that is the filter with the higher edge preserving property, can be selected for horizontal interpolation if the current picture and the reference sample array are not equal in horizontal picture resolution.

Likewise, for example, the second interpolation filter, that is the filter with the higher edge preserving property, can be selected for vertical interpolation if the current picture and the reference sample array are not equal in vertical picture resolution.

And, if the current picture and the reference sample array are not equal in horizontal and vertical picture resolution, the second interpolation filter, that is the filter with the higher edge preserving property, can be selected for horizontal and vertical interpolation.

The selection can further be performed depending on whether the predetermined first motion vector is of half-sample resolution.

Further, in order to select the resolution of the motion vectors, the encoder can refrain from using half-sample resolution for one or more vectors if the current picture is equal in picture resolution to the reference sample array in horizontal and/or vertical dimension.

For the selection, the encoder can map an alphabet of one or more syntax elements in the data stream which indicate a resolution of the predetermined first motion vector. For example, an adaptive motion vector resolution can be indicated by an amvr_flag and an adaptive motion vector resolution precision can be indicated by amvr_precision_idx, The encoder can map the alphabet onto a first set of vector resolutions, which do not comprise half-sample resolution, if one of the following conditions is met:
- a constraint information indicates that the filter version having the lower edge preserving property is disabled, e.g. for the current picture. This can for example be indicated in a picture or slice header, and for example by a ph_disable_hpel_smoothing_filter or sh_disable_hpel_smoothing_filter constraint equal to 1.
- the current picture to which the predetermined first motion vector belongs and the reference sample array to which the predetermined first motion vector relates, are at least different in one dimension of picture resolution.
- a constraint information indicates that resampling of the reference sample array is enabled. This can be indicated for example on the sequence level in a sequence parameter set, SPS. An example for such an indication is a sps_ref_picture_resample_enable_flag equal to 1. Thereby the filter version having the higher edge preserving property is used when reference sample array resampling is enabled.

The encoder can map the alphabet onto a second set of vector resolutions, which comprises half-sample resolution, if none of the above conditions is met.

It is also noted that the data stream can comprise information whether temporal consecutive pictures have same or different horizontal and/or vertical picture resolution dimensions.

Further, as stated above, the current picture can in particular be equal in picture resolution to the reference sample array in horizontal and vertical dimension.

And the reference sample array can be a region, subpicture or picture.

The encoder can also derive the constraint information from the data stream in one of per sequences of pictures, picture-wise, or slice-wise.

Finally, the above-described principles can also be embodied with a computer program product including a program with software code portions for employing the above principles, when the program is run on a processing device. Further this computer program product can also be embodied as a computer-readable medium on which the software code portions are stored.

The principles laid out above and below can also be embodied as data streams produced by encoding or by the encoder as described in this document.

Let's return to the description of embodiments which amend the current VVC draft. For example, the dependence of the constraint information is not shown in FIG. 5.

In one embodiment, the derivation of the variable hpellfldx in the motion compensation step is modified to incorporate the enable flag for reference picture signalling on the sequence level in the SPS and the smoothing filter coefficients are only used when reference picture resampling is forbidden as follows:
  hpellfldx=1 if AmvrShift is equal to 3 and sps_ref_picture_resample_enable_flag==0, i.e. reference picture resampling is disabled.

In another embodiment, a controlling syntax flag is added to the picture or slice header to indicate whether the smoothing filter is disabled for the current picture. Then the hpellfldx is derived as follows:
  hpellfldx=1 if AmvrShift is equal to 3 and controlling flag is equal to 0 (e.g., ph_disable_hpel_smoothing_filter or sh_disable_hpel_smoothing_filter).

In another embodiment, the derivation of the variable AmvrShift is modified to include information about reference picture resampling such as and avoid value of equal to 3 when
  ph_disable_hpel_smoothing_filter or sh_disable_hpel_smoothing_filter are equal to 1, or
  scaling ratio!=1, i.e. RefPicScale is not equal to 16384, or sps_ref_picture_resample_enable_flag==1

In another embodiment, it is a bitstream constraint that AmvrShift is not equal to 3 when RPR is used for a reference picture, i.e. if the current picture and reference picture have a non-equal size or the scaling ratio derived from the scaling window is not equal to 1, i.e. RefPicScale is not equal to 16384.

It follows, that the horizontal and vertical half sample interpolation filter indices hpelHorIfldx and hpelVerIfldx are derived as follows:

$$hpelHorIfIdx = (scalingRatio[\,0\,] == 16384\,)\,?\,hpellfIdx:0$$

$$hpelHorIfIdx = (scalingRatio[\,1\,] == 16384\,)\,?\,hpellfIdx:0$$

Although some aspects have been described in the context of an apparatus, it is clear that these aspects also represent a description of the corresponding method, where a block or device corresponds to a method step or a feature of a method step. Analogously, aspects described in the context of a method step also represent a description of a corresponding block or item or feature of a corresponding apparatus. Some or all of the method steps may be executed by (or using) a hardware apparatus, like for example, a microprocessor, a programmable computer or an electronic circuit. In some embodiments, one or more of the most important method steps may be executed by such an apparatus.

The inventive data stream can be stored on a digital storage medium or can be transmitted on a transmission medium such as a wireless transmission medium or a wired transmission medium such as the Internet.

Depending on certain implementation requirements, embodiments of the invention can be implemented in hardware or in software. The implementation can be performed using a digital storage medium, for example a floppy disk, a DVD, a Blu-Ray, a CD, a ROM, a PROM, an EPROM, an EEPROM or a FLASH memory, having electronically readable control signals stored thereon, which cooperate (or are capable of cooperating) with a programmable computer system such that the respective method is performed. Therefore, the digital storage medium may be computer readable.

Some embodiments according to the invention comprise a data carrier having electronically readable control signals, which are capable of cooperating with a programmable computer system, such that one of the methods described herein is performed.

Generally, embodiments of the present invention can be implemented as a computer program product with a program code, the program code being operative for performing one of the methods when the computer program product runs on a computer. The program code may for example be stored on a machine-readable carrier.

Other embodiments comprise the computer program for performing one of the methods described herein, stored on a machine-readable carrier.

In other words, an embodiment of the inventive method is, therefore, a computer program having a program code for performing one of the methods described herein, when the computer program runs on a computer.

A further embodiment of the inventive methods is, therefore, a data carrier (or a digital storage medium, or a computer-readable medium) comprising, recorded thereon, the computer program for performing one of the methods described herein. The data carrier, the digital storage medium or the recorded medium are typically tangible and/or non-transitionary.

A further embodiment of the inventive method is, therefore, a data stream or a sequence of signals representing the computer program for performing one of the methods described herein. The data stream or the sequence of signals may for example be configured to be transferred via a data communication connection, for example via the Internet.

A further embodiment comprises a processing means, for example a computer, or a programmable logic device, configured to or adapted to perform one of the methods described herein.

A further embodiment comprises a computer having installed thereon the computer program for performing one of the methods described herein.

A further embodiment according to the invention comprises an apparatus or a system configured to transfer (for example, electronically or optically) a computer program for performing one of the methods described herein to a receiver. The receiver may, for example, be a computer, a mobile device, a memory device or the like. The apparatus or system may, for example, comprise a file server for transferring the computer program to the receiver.

In some embodiments, a programmable logic device (for example a field programmable gate array) may be used to perform some or all of the functionalities of the methods described herein. In some embodiments, a field programmable gate array may cooperate with a microprocessor in order to perform one of the methods described herein. Generally, the methods are preferably performed by any hardware apparatus.

The apparatus described herein may be implemented using a hardware apparatus, or using a computer, or using a combination of a hardware apparatus and a computer.

The apparatus described herein, or any components of the apparatus described herein, may be implemented at least partially in hardware and/or in software.

The methods described herein may be performed using a hardware apparatus, or using a computer, or using a combination of a hardware apparatus and a computer.

The methods described herein, or any components of the apparatus described herein, may be performed at least partially by hardware and/or by software.

The embodiments described above are merely illustrative for the principles of the present invention. It is understood that modifications and variations of the arrangements and the details described herein will be apparent to others skilled in the art. It is the intent, therefore, to be limited only by the scope of the impending patent claims and not by the specific details presented by way of description and explanation of the embodiments herein.

The invention claimed is:

1. A video decoder configured to:
   decode a video from a data stream using motion compensation prediction to predict current pictures from reference pictures
   based on motion vector differences transmitted in the data stream at half-sample resolution,
   with first reference pictures of equal picture resolution as respective current pictures for which they are used in prediction and second reference pictures of different picture resolution than respective current pictures for which they are used in prediction, and
   using interpolation filters to obtain sub-sample values within reference sample arrays formed from respective reference pictures,
   select an interpolation filter to obtain half-sample values within a reference sample array, the reference sample array formed from a reference picture by using a motion vector, the interpolation filter selected from a first interpolation filter and a second interpolation filter, wherein the first interpolation filter has 6 nonzero filter coefficients of 3,9,20,20,9,3 and the second interpolation filter has 8 nonzero filter coefficients of $-1,4,-11,40,40,-11,4,-1$, by
   selecting the first interpolation filter when the reference picture is equal in picture resolution to the current picture in horizontal dimension and selecting the second interpolation filter when the reference picture is unequal in picture resolution to the current picture in horizontal dimension, and/or
   selecting the first interpolation filter when the reference picture is equal in picture resolution to the current picture in vertical dimension and selecting the second interpolation filter when the reference picture is unequal in picture resolution to the current picture in vertical dimension.

2. The video decoder according to claim 1, further configured to:
   obtain full-sample values within the reference sample array without using any interpolation filter.

3. The video decoder according to claim 1, further configured to:
   obtain non-half-sample sub-sample values within the reference sample array by using further interpolation filters having a higher edge preserving property than the first interpolation filter.

4. The video decoder according to claim 1, further configured to:
   perform the selection separately for horizontal interpolation and vertical interpolation.

5. The video decoder according to claim 1,
wherein the second interpolation filter is selected for horizontal interpolation if the current picture is not equal in picture resolution to the reference picture in horizontal dimension,
wherein the second interpolation filter is selected for vertical interpolation if the current picture is not equal in picture resolution to the reference picture in vertical dimension, and
wherein the second interpolation filter is selected for horizontal and vertical interpolation if the current picture is not equal in picture resolution to the reference picture in horizontal and vertical dimension.

6. The video decoder according to claim 1, wherein the data stream comprises information indicating whether temporal consecutive pictures have same or different horizontal and/or vertical picture resolution dimensions.

7. The video decoder according to claim 1,
wherein the reference sample array is a region, subpicture, or picture.

8. A video encoder configured to:
encode a video into a data stream using motion compensation prediction to predict current pictures from reference pictures,
indicate by transmitting in the data stream motion vector differences at half-sample resolution,
with first reference pictures of equal picture resolution as respective current pictures for which they are used in prediction and second reference pictures of different picture resolution than respective current pictures for which they are used in prediction, and
using interpolation filters to obtain sub-sample values within reference sample arrays formed from respective reference pictures,
select an interpolation filter to obtain half-sample values within a reference sample array, the reference sample array formed from a reference picture by using a motion vector, the interpolation filter selected from a first interpolation filter and a second interpolation filter, wherein the first interpolation filter has 6 nonzero filter coefficients of 3,9,20,20,9,3 and the second interpolation filter has 8 nonzero filter coefficients of −1,4,−11,40,40,−11,4,−1, by
selecting the first interpolation filter when the reference picture is equal in picture resolution to the current picture in horizontal dimension and selecting the second interpolation filter when the reference picture is unequal in picture resolution to the current picture in horizontal dimension, and/or
selecting the first interpolation filter when the reference picture is equal in picture resolution to the current picture in vertical dimension and selecting the second interpolation filter when the reference picture is unequal in picture resolution to the current picture in vertical dimension.

9. The video encoder according to claim 8, further configured to:
obtain full-sample values within the reference sample array without using any interpolation filter.

10. The video encoder according to claim 8, further configured to:
obtain non half-sample sub-sample values within the reference sample array by using further interpolation filters having a higher edge preserving property than the first interpolation filter.

11. The video encoder according to claim 8, further configured to:
perform the selection separately for horizontal interpolation and vertical interpolation.

12. The video encoder according to claim 8,
wherein the second interpolation filter is selected for horizontal interpolation if the current picture is not equal in picture resolution to the reference picture in horizontal dimension,
wherein the second interpolation filter is selected for vertical interpolation if the current picture is not equal in picture resolution to the reference picture in vertical dimension, and
wherein the second interpolation filter is selected for horizontal and vertical interpolation if the current picture is not equal in picture resolution to the reference picture in horizontal and vertical dimension.

13. The video encoder according to claim 8, wherein the data stream comprises information indicating whether temporal consecutive pictures have the same or different horizontal and/or vertical picture resolution dimensions.

14. The video encoder according to claim 8,
wherein the reference sample array is a region, subpicture, or picture.

15. A method for decoding a video, the method comprising:
decoding a video from a data stream using motion compensation prediction to predict current pictures from reference pictures
based on motion vector differences transmitted in the data stream at half-sample resolution,
with first reference pictures of equal picture resolution as respective current pictures for which they are used in prediction and second reference pictures of different picture resolution than respective current pictures for which they are used in prediction, and
using interpolation filters to obtain sub-sample values within reference sample arrays formed from respective reference pictures,
selecting an interpolation filter to obtain half-sample values within a reference sample array, the reference sample array formed from a reference picture by using a motion vector, the interpolation filter selected from a first interpolation filter and a second interpolation filter, wherein the first interpolation filter has 6 nonzero filter coefficients of 3,9,20,20,9,3 and the second interpolation filter has 8 nonzero filter coefficients of −1,4,−11,40,40,−11,4,−1, by
selecting the first interpolation filter when the reference picture is equal in picture resolution to the current picture in horizontal dimension and selecting the second interpolation filter when the reference picture is unequal in picture resolution to the current picture in horizontal dimension, and/or
selecting the first interpolation filter when the reference picture is equal in picture resolution to the current picture in vertical dimension and selecting the second interpolation filter when the reference picture is unequal in picture resolution to the current picture in vertical dimension.

16. A method for encoding a video comprising:
encoding a video into a data stream using motion compensation prediction to predict current pictures from reference pictures,
indicating by transmitting, in the data stream, motion vector differences at half-sample resolution, with first reference pictures of equal picture resolution as respective current pictures for which they are used in prediction and second reference pictures of different picture resolution than respective current pictures for which they are used in prediction, and using interpolation filters to obtain sub-sample values within reference sample arrays formed from respective reference pictures, selecting an interpolation filter to obtain half-sample values within a reference sample array, the reference sample array formed from a reference picture by using for a motion vector, the interpolation filter selected from a first interpolation filter and a second interpolation filter, wherein the first interpolation filter has 6 nonzero filter coefficients of 3,9,20,20,9,3 and the second interpolation filter has 8 nonzero filter coefficients of −1,4,−11,40,40,−11,4,−1, by selecting the first interpolation filter when the reference picture is equal in picture resolution to the current picture in horizontal dimension and selecting the second interpolation filter when the reference picture is unequal in picture resolution to the current picture in horizontal dimension, and/or selecting the first interpolation filter when the reference picture is equal in picture resolution to the current picture in vertical dimension and selecting the second interpolation filter when the reference picture is unequal in picture resolution to the current picture in vertical dimension.

* * * * *